E. Y. MOORE.
TROLLEY.
APPLICATION FILED AUG. 27, 1910.
997,690.
Patented July 11, 1911.
2 SHEETS—SHEET 1.
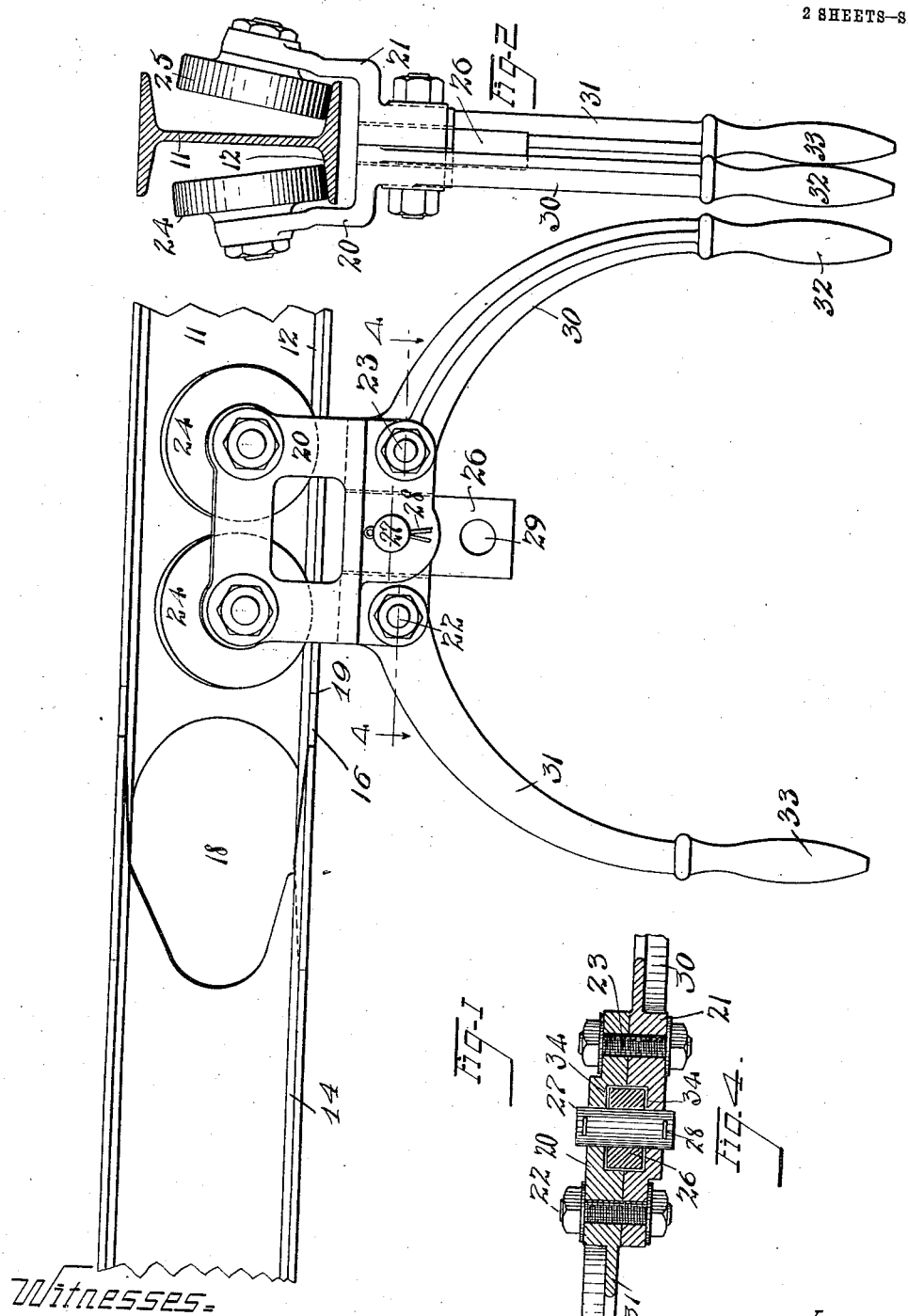
Witnesses
Brennan B. West
Oliver M. Kappler
Inventor
Edward Y. Moore
By Albert K. Baker, Atty.

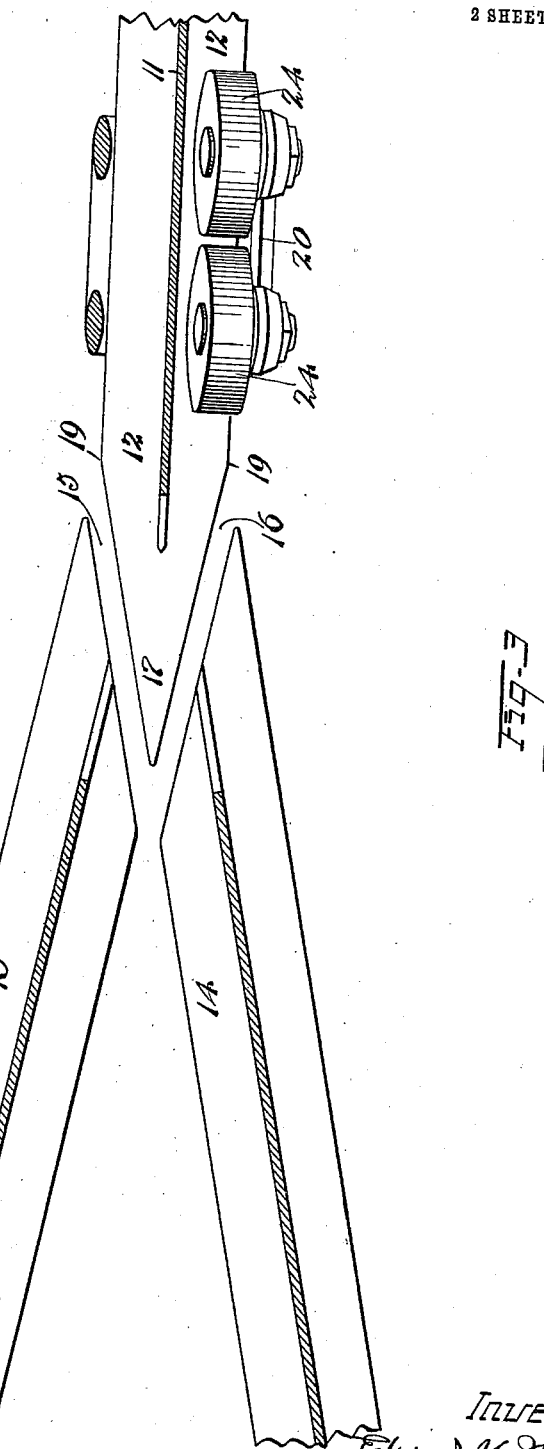

UNITED STATES PATENT OFFICE.

EDWARD Y. MOORE, OF CLEVELAND, OHIO.

TROLLEY.

997,690.  Specification of Letters Patent.  Patented July 11, 1911.

Original application filed March 3, 1910, Serial No. 547,001. Divided and this application filed August 27, 1910. Serial No. 579,327.

*To all whom it may concern:*

Be it known that I, EDWARD Y. MOORE, a citizen of the United States, residing at Cleveland, in the county of Cuyahoga and State of Ohio, have invented a certain new and useful Improvement in Trolleys, of which the following is a full, clear, and exact description, reference being had to the accompanying drawings.
One of the objects of this invention is to so arrange a trolley and a supporting track that the trolley may be conveniently shifted by hand from a main track to any of a plurality of branches without the necessity of throwing a switch.

Another object is to provide such trolley with suitable handles for enabling its convenient actuation; and a third object is to provide the structure in a very simple and cheap form.

My prior application, #547,001, filed March 3, 1910, shows a trolley having the characteristics of the trolley shown herein relating to the convenient shifting between a main and a branch track, and, as to that feature, this application is a division of the prior application referred to.

In the drawings, Figure 1 is a side elevation of my trolley on a trackway composed of I-beams making a main and branch tracks; Fig. 2 is an end elevation of such trolley, the I-beam support being in section; Fig. 3 is a horizontal section of the trackway showing a portion of the trolley in place; and Fig. 4 is a substantially horizontal section through the hoist frame, this section, for clearness, being on a plane intermediately offset, as indicated by the line 4—4 in Fig. 1.
Referring, by numerals, to the structures shown in the drawing, 11 represents the web and 12 the lateral bottom flanges of a suitable I-beam support for the trolley. This I-beam is adapted to have branches, as illustrated at 13 and 14 in Fig. 3. At the junction of the branches with the main trackway, the track is peculiarly formed in a way which coöperates with the peculiar trolley structure, as will be hereinafter more fully explained.

The trolley frame comprises a pair of members 20 and 21, which abut each other beneath the I-beam flange and are there bolted together by bolts 22 and 23. The members 20 and 21 extend upwardly on opposite sides of the flange and there carry the two pairs of supporting wheels 24 and 25. For supporting the load by the trolley frame, there is shown in the drawing a bar 26 occupying recesses 34 in the respective frame members 20 and 21 and held in such position by a pin 27 locked by suitable cotters 28. The bar 26 is shown as having an opening 29 for attachment of load supporting mechanism.

To provide convenient handles for shifting the trolley, I extend each of the frame members 20 and 21 downward by curved shanks 30 and 31, which have handles 32 and 33 at their lower ends. Each frame member, with its curved shank and handle may be one integral piece, and such two members may be identical in construction, thereby reducing the expense of manufacture. When the frame parts are mounted upon each other, as shown in Figs. 1, 2 and 4, one of the curved shanks springs from one end of the trolley and the other from the other end, so that the handles are conveniently positioned for shifting the load when the operator stands either in front of or behind the load.

As heretofore stated, one of the objects of this invention is to provide the trolley and track in such form that the trolley may be enabled to pass with the greatest ease from a main portion of the trackway to different branches. I achieve this result, partly by arranging the track as shown in Figs. 1 and 3, and partly by the trolley structure. As shown in Fig. 3, two branches 13 and 14 of the track are I-beams having their flanges separated from the flange 12 by gaps, designated 15 and 16, the flange of the main track being brought to a point, as 17, between the two diagonally cut ends of the flanges of the track portions 13 and 14. By this means the passageways 15 and 16, referred to, are formed. The edge of the point portion 17, adjacent to the passageway 16, is parallel with the corresponding edge of the track portion 13. The same is true with the other edge of the point 17 and the track portion 14. Adjacent to the track junction, the web 11 is cut away, while, on the branches, the web is also cut away. The combined opening through the main and branch webs may take the form illustrated at 18, in Fig. 1. The opening 18 and the passages 15 or 16, enable the trolley traveling on the main track to be passed to either of the branch tracks, the corresponding side member 20 or 21 of the trolley passing through the opening 15 or 16, as the case may be.

The angles of the gaps 15 and 16 are so arranged, with reference to the trolley wheels, that in passing across these gaps, only one wheel passes at a time, so at least three of the wheels are always supporting the load. When the trolley on the main track arrives at the entrance to the passageways 15 and 16, it is simply necessary to push or pull it by hand, one side or the other to determine which passageway is to be entered. As soon as the corresponding side has come into engagement with the end of the flange of the corresponding branch track, the pathway is determined. In the movement from either branch to the main trackway, the passage is automatic without the necessity of lateral hand shifting. The frame members 20 and 21 may be made elliptical or with reduced edges alongside of the track flanges, as shown in Fig. 3, this facilitating the passage to a branch track.

To enable the trolley to stand closely alongside of the track at all times, and, at the same time, to easily pass the salient angles 19 of the main flange, where the point 17 begins, I may form the side supports of an inverted U-shape, as heretofore referred to, and as shown in Fig. 1. With such structure, when the wheel base is twisted out of alinement with the main trackway in passing to or from a branch, the projecting point 19 will stand within the space between the depending arms of the side members so that there is no binding at such points.

Having thus described my invention, what I claim is:—

1. The combination, with a trackway having a branch separated therefrom, of a depending trolley supported on the trackway by side members and two pairs of supporting wheels carried thereby, at least one of said side members being composed of an intermediate cross portion and two narrow uprights rising vertically beneath the axes of the wheels carried thereby, whereby there is presented an effective opening opposite the trackway.

2. In a trolley, the combination of a frame made of members secured together comprising portions adapted to stand beneath the trackway, portions adapted to extend upwardly alongside the trackway, and portions extending downwardly, the upwardly extending portions being of inverted U-shape, with parallel legs and horizontal intermediate portions and wheels on the upward portions.

3. In a trolley, the combination with the supporting members of a trolley frame, of means for supporting the load, a pair of shanks extending downwardly from the trolley frame and handles on the lower ends of said shanks.

4. In a trolley, the combination of a frame made of two members secured together comprising portions adapted to stand beneath the trackway and portions adapted to extend upwardly alongside the trackway and portions extending downwardly, handles on such downward portions, and wheels on the upward portions.

5. In a trolley adapted to ride on an I-beam flange, the combination of a frame composed of two members bolted together, each member having a portion to stand beneath the flange and having an upwardly extending portion and a downwardly extending portion, handles on the downwardly extending portions, and wheels carried by the upwardly extending portions.

6. In a trolley, the combination of a frame composed of two identical members bolted together, each member having an upwardly extending portion and a downwardly extending portion, handles on the downwardly extending portions, and wheels carried by the upwardly extending portions.

7. In a trolley adapted to travel on an I-beam flange, the combination of a frame adapted to stand beneath the flange and having portions rising on opposite sides of the flange, wheels carried by such rising portions, depending handles, and a load supporting member carried by the frame between the members that carry the handles.

8. In a trolley adapted to travel on an I-beam flange, the combination of a frame adapted to stand beneath the flange and having portions of inverted U-shape rising on opposite sides of the flange, wheels carried by such rising portions at their shoulders, shanks depending from the frame and carrying handles, and a load supporting member carried by the frame between the shanks.

9. In a trolley, the combination, of a pair of frame members adapted to abut each other, bolts for securing them together, there being recesses in the adjoining faces of the frame members, a load supporting bar occupying each recess, and a pin for holding said bar occupying openings in the frame members.

10. In a trolley, the combination of a pair of frame members adapted to abut each other, bolts for securing them together, there being recesses in the adjoining faces of the frame members, a load supporting bar occupying such recesses and held therein, each frame member having a downward extension provided with a handle, and an upward extension carrying a pair of wheels.

In testimony whereof, I hereunto affix my signature in the presence of two witnesses.

EDWARD Y. MOORE.

Witnesses:
  V. MUMFORD MOORE,
  CLARENCE PAGE.

Copies of this patent may be obtained for five cents each, by addressing the "Commissioner of Patents, Washington, D. C."